United States Patent [19]

Wittrock

[11] Patent Number: 4,721,997
[45] Date of Patent: Jan. 26, 1988

[54] SIGNAL TO NOISE RATIO MEASUREMENT BY SAMPLING NOISE OUTSIDE CARRIER FREQUENCY

[75] Inventor: Glen Wittrock, Sioux Falls, S. Dak.
[73] Assignee: Sencore, Inc., Sioux Falls, S. Dak.
[21] Appl. No.: 869,729
[22] Filed: Jun. 2, 1986
[51] Int. Cl.[4] .................... H04N 17/00; H04N 17/02
[52] U.S. Cl. ...................................... 358/10; 358/139
[58] Field of Search ........................ 358/10, 139, 86; 324/57 N

[56] References Cited

U.S. PATENT DOCUMENTS

| 3,683,282 | 8/1972 | D'Amato et al. | 358/139 |
| 3,875,328 | 4/1975 | Gibson et al. | 358/139 |
| 3,995,105 | 11/1976 | Krivosheev et al. | 358/139 |

OTHER PUBLICATIONS

"Signal-To-Noise Ratio Automatic Measurement in the Blanking Interval of a Video Signal" by Dr. Ing. P. D'Amato & Dr. Ing. G. Barbieri, Conference: Proceedings of the Joint Conference on Television Measuring Techniques, London, May 1970.

Primary Examiner—John W. Shepperd
Assistant Examiner—Robert M. Bauer
Attorney, Agent, or Firm—Edmond T. Patnaude

[57] ABSTRACT

The signal-to-noise ratio of the video portion of a television signal is measured by measuring the noise level in a 200 KHz band spaced 2 MHz from the video carrier during the vertical sync period and the carrier level is also measured during the vertical sync period. The two measurement signals are sequentially applied to a microprocessor which calculates the signal-to-noise ratio from the two measurements and drives a meter which displays the signal-to-noise ratio in decibels.

7 Claims, 1 Drawing Figure

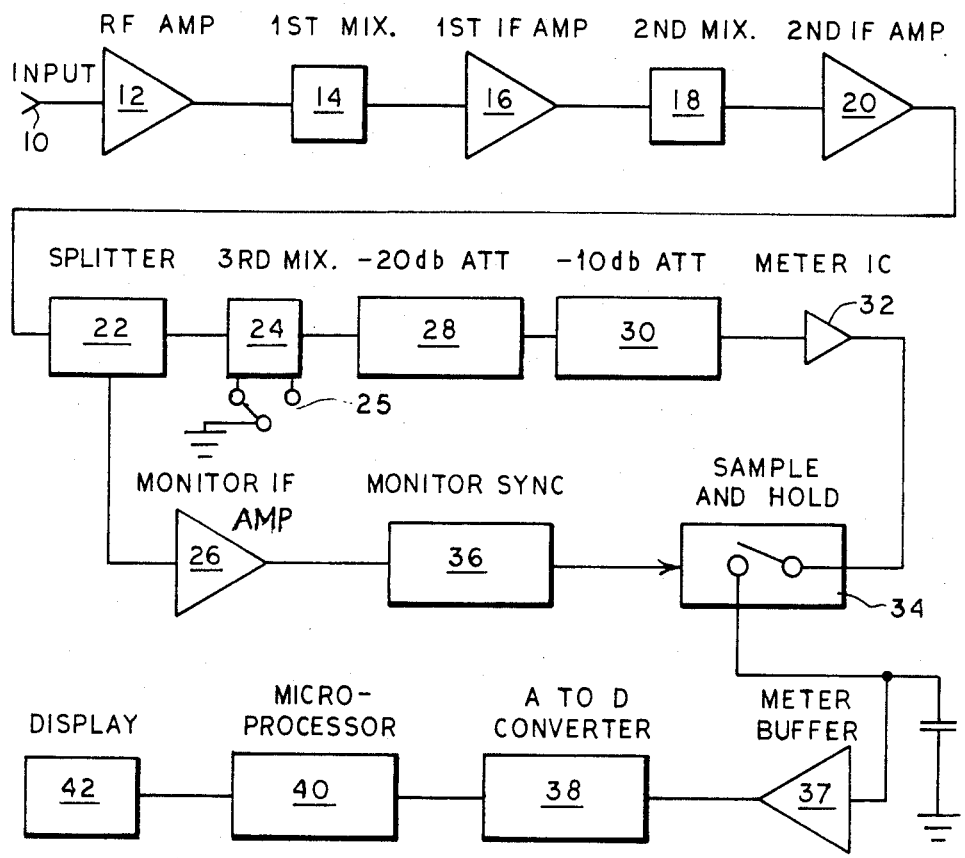

SIGNAL TO NOISE RATIO MEASUREMENT BY SAMPLING NOISE OUTSIDE CARRIER FREQUENCY

The present invention relates in general to the measurement of noise in a television signal and it relates in particular to a new and improved method and apparatus for measuring the system noise at a subscriber terminal of a cable television system.

BACKGROUND OF THE INVENTION

Certain technical standards with which each cable television system should comply have been established. One such performance standard is that the ratio of visual signal level to system noise shall not be less than 35 decibels.

In accordance with the practice of the prior art, this signal-to-noise ratio has been measured by first measuring the noise on an unused cable television channel or by turning off the signal on the channel where the noise was being measured. The latter procedure is generally used where the cable system is crowded. The strength of the television video signal on one of the used channels is also measured, and the signal-to-noise ratio is then calculated using the results of these two measurements.

SUMMARY OF THE INVENTION

Briefly, in accordance with the teachings of the present invention the signal-to-noise ratio of the video portion of a television signal is measured on a single channel by measuring the noise level in a relatively narrow, predetermined portion of the video signal spectrum which is sufficiently separated from both the video carrier and the color subcarrier so that the control signal harmonics are insignificant as compared to the system noise within that narrow band and by making this measurement during the vertical sync signal portion of the television signal when there is no video. The resulting noise measurement is stored in memory and the signal strength of the video carrier is thereafter measured during the sync portion of the television signal. These two measurements are supplied to a microprocessor in which the signal-to-noise ratio is calculated and which drives a meter which displays the signal-to-noise ratio in decibels.

GENERAL DESCRIPTION OF THE DRAWINGS

The present invention will be better understood by a reading of the following detailed description taken in connection with the accompanying drawing wherein the single figure is a schematic circuit diagram of a metering system for carrying out the present invention.

DETAILED DESCRIPTION OF A PREFERRED EMBODIMENT OF THE INVENTION

Referring to the drawing it may be seen that the meter which is there shown includes an input jack 10 to which the television signal whose signal-to-noise ratio is to be measured is applied. Ordinarily this signal is the television signal which is applied to the antenna input terminals of a television receiver from a cable television system. As shown, the jack 10 is coupled to the input of an RF amplifier 12 wherein the entire television signal is amplified before being connected to a first mixer stage 14 wherein the frequencies of the video carrier, the color subcarrier and the audio carrier and their respective sidebands are transposed to the respective I.F. frequencies.

The output signal from the first mixer stage is, therefore, the first IF signal and it includes the audio and video information as well as the control signals such as the blanking impulses, the horizontal sync pulses and the vertical sync pulses. The first IF signal is connected to a first IF amplifier stage 16 wherein it is amplified before being applied to the input of a second mixer stage 18 wherein the first IF signal is further reduced in frequency to provide the standard second IF signal which includes the audio and video information as well as the picture control signals. The second IF signal is standard in the industry and includes a video modulated IF carrier at a frequency of 45.75 MHz and an audio modulated IF carrier having a frequency of 41.25 MHz with the control signals being modulated periodically on the video IF carrier.

The second IF signal is further amplified in a second stage IF amplifier 20 and is then applied to a conventional splitter 22 having a first output which is connected to the input of a third mixer 24 and a second output which is connected to the input of a monitor IF amplifier 26. For the reasons explained in greater detail hereinafter, the third mixer 24 is under the control of a manually operated switch 25 which is used to control the mixer 24 by controlling the frequency of its oscillator to permit measurement of the video carrier signal when the switch 25 is in one position or to measure the level of only a relatively narrow band of frequencies located between but displaced from both the video carrier and the color subcarrier when the switch 25 is in the other position.

The output signal from the third mixer 24 is connected to a first attenuator 28 wherein the power level of the signal is reduced by 20 dB and the output of the attenuator 28 is connected to a second attenuator 30 where the power level of the signal is further reduced by an additional 10 dB. If desired, the attenuators 28 and 30 may be located ahead of the mixer 24. The attenuated signal is applied to a meter IC 32 which produces a DC voltage at its output which is proportional to the RMS value in decibels of the signal which is applied thereto.

When the switch 25 is in the illustrated position, the associated oscillator is operated at 33.05 MHz whereby the output frequency of the signal from the third mixer is spaced two MHz from the video carrier. The meter 32 is designed to have a 200 KHz bandwidth and to measure the RMS value of the signal within this narrow band. Since during the vertical sync pulse period the spectrum between the video carrier and the color subcarrier is not used, the only signal appearing in this narrow bandwidth is that resulting from system noise within the cable system. During the sync pulse period there are, of course, timing pulses and serrations in the vertical pulses themselves, but the harmonics, i.e., side bands, that are produced at multiples of 31,500 KHz have an insignificant level in the narrow bandwidth displaced by two MHz from the video carrier. Because in some systems the color subcarrier is present at all times, it is necessary that the narrow band in which the noise is measured also be displaced from the color subcarrier. It has been found that by measuring the level of the signal in a narrow band located between the video carrier and the color subcarrier and spaced 2 MHz from the video carrier an accurate noise measurement can be made.

The DC output signal from the meter IC 32 is connected to a conventional sample and hold circuit 34 which samples the output from the meter 32 during the vertical sync pulse period and stores that value. If desired, the sample could be taken during the horizontal pulse period but because the vertical sync pulse period is much longer it is preferred to make the measurements during the vertical sync period. The sample and hold circuit 34 is controlled by the output signal from the monitor IF amplifier 26 which is connected to a monitor sync control circuit 36 which controls the sample and hold circuit 34 so that the samples are taken only during the vertical sync pulse period.

After the noise level has thus been measured, the operator switches the switch 25 to the other position whereby the associated oscillator is switched to a frequency of 35.05 MHz so that the signal which is applied to the meter IC 32 is centered at the video carrier frequency and the level of that signal is thus proportional to the sync signal portion of the television signal. With the switch 25 in the signal measuring position the monitor 36 is still operated to sample the output of the meter IC only during the vertical sync portion of the television signal and that sample is also held in the sample and hold circuit 34. The noise level and video carrier level signals are sequentially coupled through a meter buffer amplifier 37 to an analog to digital converter 38 which produces digital signals respectively representative of the decibel level of the outputs of the meter IC 32 during measurement of the signal level and during measurement of the noise level, and these signals are coupled to a microprocessor 40 which calculates the ratio in decibels of these signals relative to one another and drives a display 42 which provides a visual representation of the signal-to-noise ratio of the television signal applied to the input jack 10.

In operation, the technician simply couples the input jack 10 to the output terminal of the cable system which is normally coupled to a television receiver and sets the switch 25 to the noise measuring position. After a brief time during which the noise is measured over several picture frames, the switch 25 is switched to the other position wherein the level of the video signal during the vertical sync period is measured. These two separate measurements are processed so that the signal-to-noise ratio is displayed on the display 42. Although the video signal which is measured also includes noise, in an operative cable system this noise level is always very small relative to the video level and does not, therefore, affect the calculated signal-to-noise ratio.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. A method of measuring the ratio of visual signal level to system noise in a standard color television signal having a video modulated video carrier, a color subcarrier and control signals including sync signals modulated on the video carrier, comprising the steps of
    measuring the noise level of said television signal only during the occurrence of said sync signal within a frequency band spaced from said video carrier and from said color subcarrier,
    measuring the level of the modulated video carrier during the sync signal period,
    computing the ratio of the measured noise level to the measured modulated video carrier level, and
    displaying a visual representation of the computed ratio.

2. A method according to claim 1 wherein said frequency band is about 200 KHz wide and is spaced about 2 MHz from said video carrier.

3. In a meter for measuring the signal-to-noise ratio of a color television signal including a video modulated carrier, a color subcarrier and control signals selectively modulated on said video carrier, the combination comprising
    means for measuring the level of said video modulated video carrier and for developing a first signal having a voltage level proportional to said level of said video modulated video carrier,
    means responsive to the presence of said control signals in said television signal for measuring the level of said television signal in a predetermined frequency band located between and spaced from said video carrier and said color subcarrier during the occurrence of said control signals only and for developing a second signal having a voltage level proportional to the level of said television signal in said predetermined frequency band only during the occurrence of said control signals,
    means responsive to said first and second signals for producing a third signal proportional to the ratio of said first and second signals, and
    means responsive to said third signal for displaying a visual representation of said signal-to-noise ratio.

4. The combination according to claim 3 wherein said predetermined frequency band is spaced about 2 MHz from the video carrier frequency.

5. The combination according to claim 4 wherein said predetermined frequency band has a bandwidth of about 200 KHz.

6. In a meter for measuring the signal-to-noise ratio of a color television signal including a video modulated carrier, a color subcarrier and control signals selectively modulated on said video carrier, the combination comprising
    first mixer means responsive to said color television signal for producing an IF carrier modulated by said video and control signals,
    second mixer means responsive to said modulated IF carrier for producing a signal having a level proportional to the level of said modulated carrier at one of a plurality of selected frequencies displaced from said IF carrier, and
    means responsive to said control signals for sampling the outputs of said first and second mixer means only during the occurrence of said control signals.

7. In a meter for measuring the visual signal-to-noise ratio of a television signal including a video carrier modulated with a video signal and sync signals, comprising in combination
    a frequency selective meter for measuring the average power level within a predetermined bandwidth of a signal applied thereto and for producing an output signal proportional to said average power level,
    mixer means having an input to which a modulated video carrier signal is adapted to be connected for shifting said carrier frequency a first amount when in a first operating condition or a second amount when in a second operating condition, whereby the output of said mixer is a frequency shifted modulated video carrier signal, selector switch means operatively connected to said mixer means for causing said mixer means to operate in one or the other of said first and second conditions, means connecting the output of said mixer means to the input of said meter, and means responsive to the respective output signals from said meter means when said mixer means is in said first operating condition and in said second operating condition and only during the occurrence of said sync signals for displaying a visual representation of the ratio of said signals.

* * * * *